United States Patent [19]

Harmon et al.

[11] Patent Number: 4,853,717

[45] Date of Patent: Aug. 1, 1989

[54] SERVICE STATION FOR INK-JET PRINTER

[75] Inventors: J. Paul Harmon; Peter J. Kehoe; John D. Rhodes; Martin D. Hash, all of Vancouver, Wash.

[73] Assignee: Hewlett-Packard Company, Palo Alto, Calif.

[21] Appl. No.: 113,044

[22] Filed: Oct. 23, 1987

[51] Int. Cl.[4] .......... G01D 15/16

[52] U.S. Cl. .......... 346/140 R; 346/1.1; 346/75; 400/126

[58] Field of Search .......... 346/140 Pd, 75, 1.1; 400/126

[56] References Cited

U.S. PATENT DOCUMENTS

| | | | |
|---|---|---|---|
| 4,533,927 | 8/1985 | Iwagami et al. | 346/140 Pd |
| 4,567,494 | 1/1986 | Taylor | 346/140 Pd |
| 4,577,203 | 3/1986 | Kawamura | 346/75 |

*Primary Examiner*—E. A. Goldberg
*Assistant Examiner*—Huan Tran
*Attorney, Agent, or Firm*—S. A. Kassatly

[57] ABSTRACT

A service station (10) for use in an ink-jet printer comprises (a) pump means (12) for priming the printhead (18) of a cartridge (20), (b) a sled (14) to actuate the service station and seal the printhead, and (c) wiping means (58) for cleaning the printhead.

The service station is fixed at one end of travel of a carriage (22) supporting the cartridge. The carriage is adapted to move bidirectionally by means of a controlled motor.

The service station performs a number of functions, including clearing clogged nozzles in the printhead and removing bubbles therefrom, covering the nozzles with a protective cap (50) when the printhead is not in use to prevent contamination thereof, preventing ink from drying out in the nozzles, wiping contaminants picked up during printing off the nozzles, and providing a location (60) for firing the nozzles for clearing out thereof prior to printing.

19 Claims, 4 Drawing Sheets

Fig. 2a.
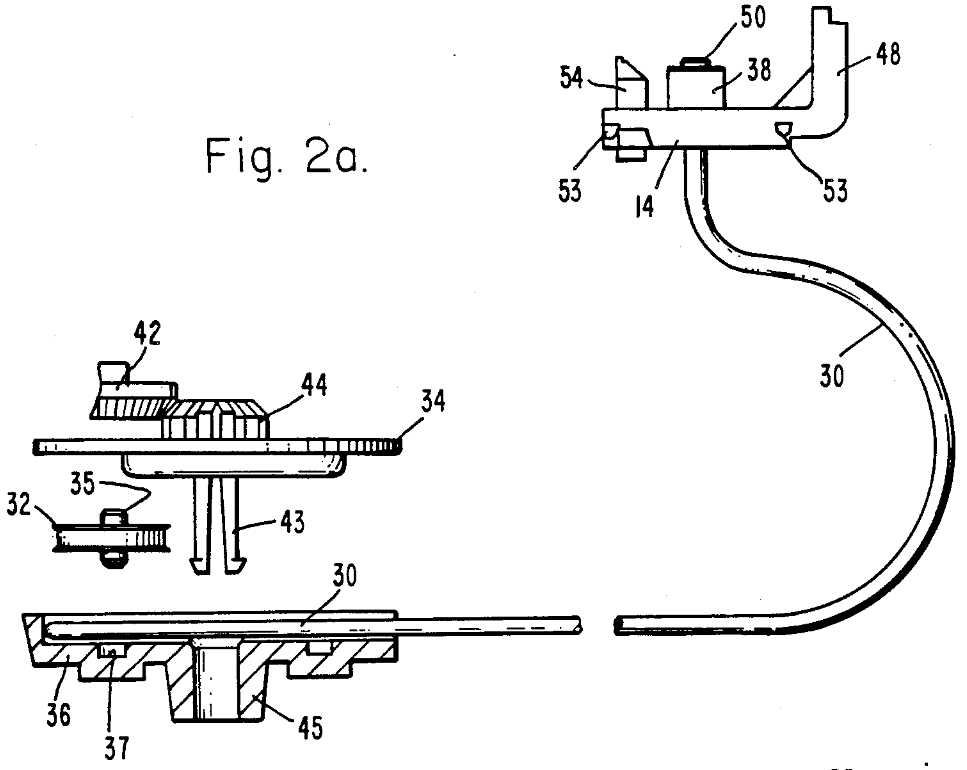
Fig. 2b.
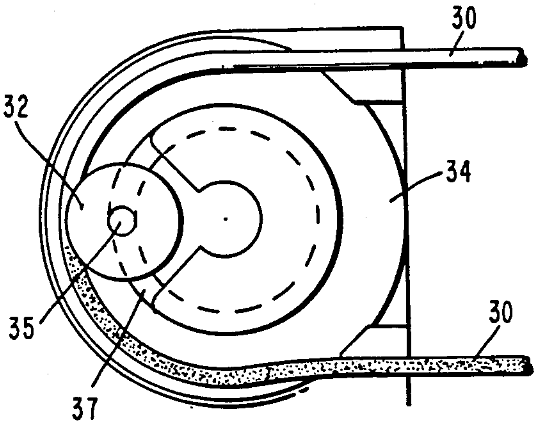
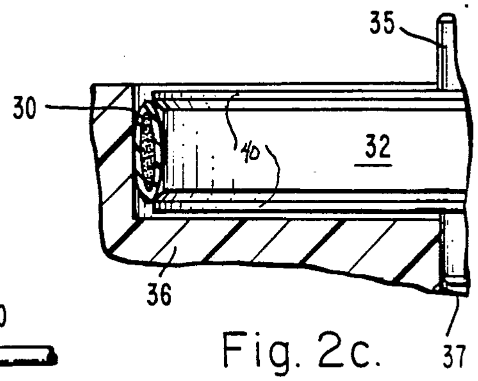
Fig. 2c.

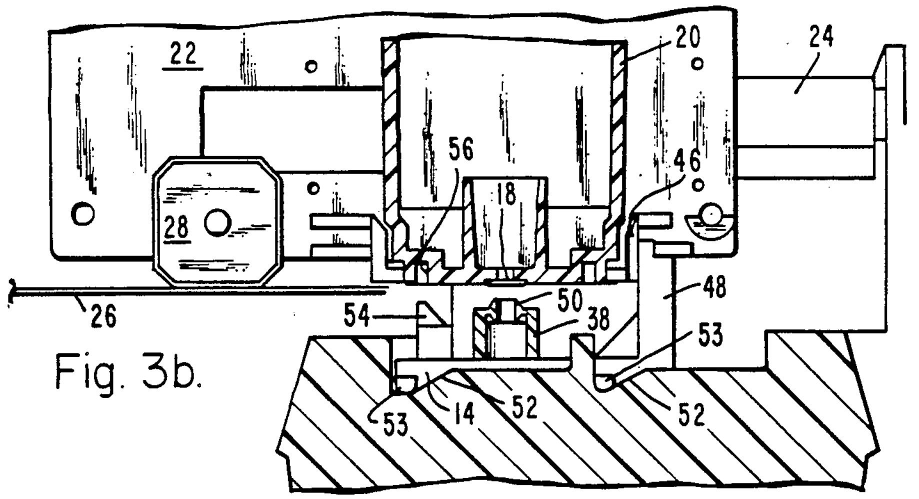
Fig. 3b.
Fig. 3c.
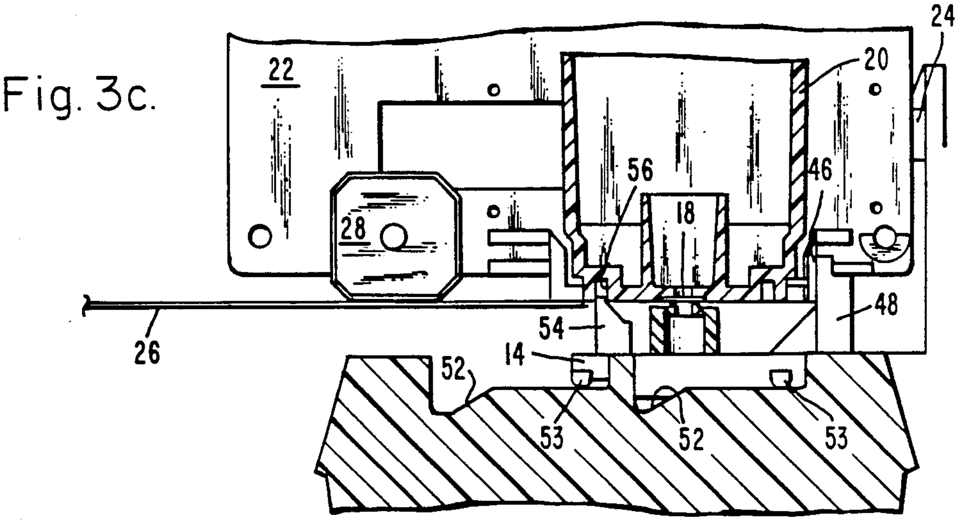
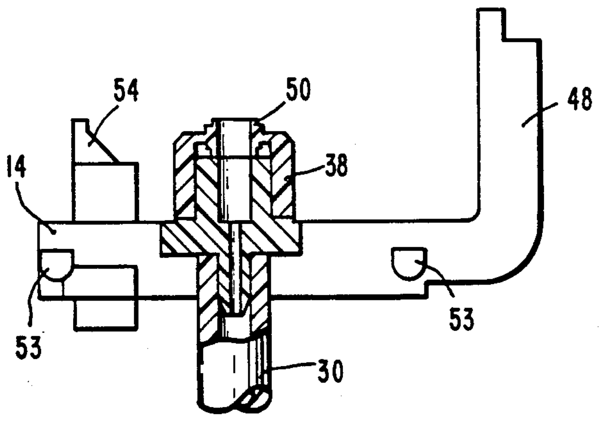
Fig. 3a.

SERVICE STATION FOR INK-JET PRINTER

TECHNICAL FIELD

The present invention relates to ink-jet printers, and, more particularly, to a subassembly in such printers known as a service station.

BACKGROUND ART

Service stations in ink-jet printers are intended to maintain a thermal ink-jet printhead in good working order for the service life of the printhead. As is well-known to those skilled in this art, the printhead is formed as part of a printing cartridge. The cartridge contains a reservoir of ink, and the printhead contains an assembly of passageways, firing elements (resistors) and nozzles for firing droplets of ink toward a printing medium, such as paper.

During the course of operation, it is possible for nozzles to become clogged with ink and for bubbles of air to be trapped in such a manner as to interfere with the proper operation of the printhead. Also, it is desirable to prevent contaminants, such as paper dust, from affecting the operation of the nozzles and to prevent ink from drying in the nozzles when the printhead is at rest. Finally, it is desirable to clear out soft viscous plugs of ink, which may form while the printhead is at rest. This should be done prior to initiation of printing, to ensure that all nozzles in the orifice plate of the printhead are firing properly.

A service station can address the afore-mentioned problems and requirements. While service stations are not per se novel in thermal ink-jet printing, it is a goal to provide a service station with easy operation which maximizes a number of functions in a minimum of space. The preferred service station has a number of functions, including:

1. clear clogged nozzles and remove bubbles;
2. cover nozzles when the printhead is not in use to prevent contamination thereof;
3. prevent ink from drying out in the nozzles when the printhead is not in use;
4. wipe contaminants picked up during printing off of nozzles; and
5. provide a location to fire nozzles into for clearing out the soft viscous plugs of ink.

DISCLOSURE OF INVENTION

In accordance with the invention, a service station for use in an ink-jet printer comprises:

(a) pump means for priming the printhead, (b) a sled to actuate the service station and including means to seal the printhead, and (c) wiping means for cleaning the printhead.

Use of a fixed wiper reduces the number of parts otherwise required to clean the printhead. Use of a sled eliminates solenoids. The sled is self-actuating, and requires no external control, other than through the action of the carriage motor which controls the motion of the carriage supporting the cartridge. Use of a ramp in conjunction with the sled permits positive sealing of the printhead with a cap and eliminates sliding of the cap across the orifice plate of the printhead.

Figure 1:
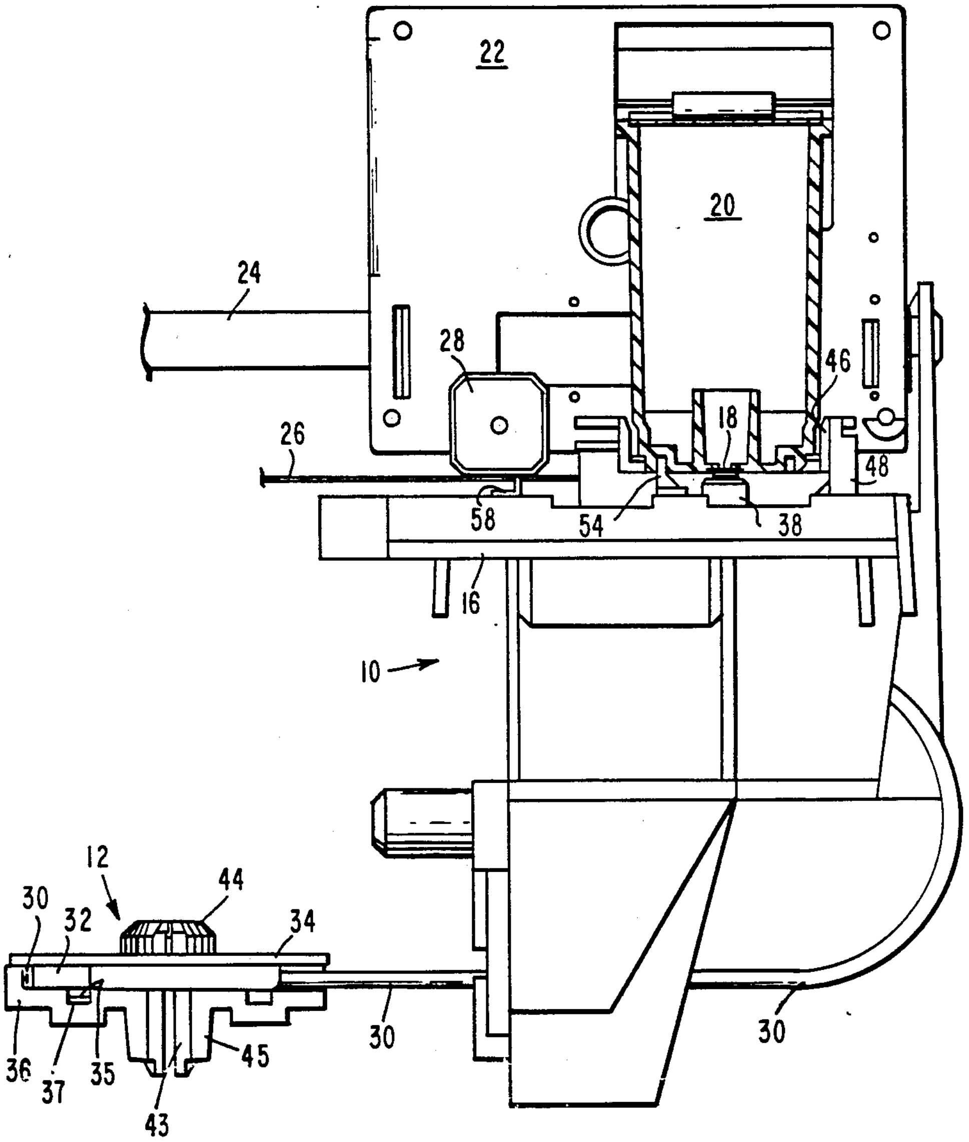
FIG. 1 is a front elevational view, partly in section, of an assembled service station in accordance with the invention.

FIG. *2a* is a front elevational view, partly exploded, of a peristaltic pump in accordance with the invention;

FIG. *2b* is a top plan view of a portion of the peristaltic pump of FIG. *2a;*

FIG. *2c* is a detail of a portion of the roller used in the peristaltic pump;

FIG. *3a* is a front elevational view, partly in section, of a portion of the sled subassembly of the service station of the invention;

FIG. *3b* is a front elevational view, partly in section, of the sled just after engagement thereof by the carriage and prior to capping of the printhead;

FIG. *3c* is a view similar to that of FIG. *3b,* but of the sled and carriage subsequent to capping of the printhead;

FIG. *4a* is a top plan view of the wiper bracket of the service station assembly;

FIG. *4b* is a front elevational view of the wiper bracket; and

FIG. *4c* is cross-sectional view taken along the line 4—4 of FIG. *4a.*

BEST MODES FOR CARRYING OUT THE INVENTION

Referring now to the drawings wherein like numerals of reference designate like elements throughout, an assembled service station 10 is depicted. The service station 10 comprises a peristaltic pump, denoted generally at 12, a sled 14, and a wiper bracket 16. The service station 10 is shown in position capping a printhead 18 of a pen cartridge 20.

The service station 10 provides a region at one end of the bidirectional movement of a carriage 22, which holds the cartridge 20 in locked alignment. The carriage 22 is moved bidirectionally along a guide rod 24, typically by means of a belt (not shown), connected to a carriage motor (not shown), controlled by a microprocessor (not shown). These latter elements are conventional in the art and hence do not form a part of this invention. The cartridge 20 is readily available on the market. For instance, one such cartridge is sold by Hewlett-Packard Company under part number 51608A.

The carriage 22, which can rotate about the guide rod 24, is urged against the surface of a paper guide 26 by virtue of its own weight, due to offset positioning (center of gravity) of the carriage on the front side of the guide rod. A low friction spacer 28 contacts the paper guide surface and keeps the printhead 18 spaced the appropriate distance from the print medium (not shown). In the arrangement depicted in FIG. 1, the print medium would be to the left of the service station 10, normal to the plane of the drawing. The spacer 28 may be a separate piece as shown in the drawing or a molded-in feature of the cartridge or carriage.

The peristaltic pump 12 comprises a tube 30, a roller 32, and a pump body 34. As seen more clearly in FIG. *2a,* the peristaltic pump principle, which is conventional in the art, works by squeezing the tube 30 between the roller 32 and a wall 36. Advantageously, the wall 36 may be molded into the chassis of the printer. As used herein, the chassis constitutes the frame of the printer.

The roller 32 is provided with an axial hub 35, which rides in track or recess 37 of the chassis.

The squeeze point of the pump 12 is moved along a portion of the length of the tube 30. In so doing, a pressure differential can be created to effect the priming operations on the printhead.

It will be noted that the pump 12 uses only one roller 32, rather than the conventional three rollers. Because the tube 30 is only squeezed by the roller 32 over 210° of motion, the pump allows the system to be vented without using an extra part, such as a solenoid venting valve tied into the tubing, as is commonly done in the prior art. The configuration of the invention allows the printhead 18 to vent to atmosphere as it caps (discussed in greater detail below), preventing a pressure rise as the cap collapses (see FIGS. 3*b*–*c*). Even a small pressure rise when capping is intolerable because it can force bubbles of air up into the printhead 18.

The use of one roller 32 also permits the tubing 30 to relax between rolling. Consequently, the tubing 30 will not get dragged into the pump 12 during operation thereof, and the tubing will not take a compression set.

As seen in FIG. 2*a*, one end of the tubing 30 is attached to the bottom of a cap chamber 38. The other end of the tubing 30 terminates in free space, positioned over an absorber pad (not shown). The absorber pad is used as a holding vessel while the ink evaporates into the air.

The vent to atmosphere is achieved by use of long tube 30 having a small inside diameter, about 0.030 to 0.060 inch ID. Because of the small inside diameter, diffusion is very slow, yielding an effective vapor seal while still allowing the cap chamber 38 to be vented to atmosphere. This unique aspect of the configuration may be difficult to easily achieve in any other way.

The roller 32 in the pump 12 employs circumferential ridges 40 which help to center the tubing 30 in the area of highest pinching force. Consequently, the configuration is more tolerant of manufacturing variations.

The roller 32 is fixed on the pump body 34 and rotates once into position by activation of a multiplexer (not shown) by means of a bevel gear 42, which engages bevel gear 44 on the pump body.

The body 34 of the pump 12 is designed to allow a robot (or other automation) to assemble it. The robot can place the roller 32 and then snap the pump body 34 in place because it is assembled straight down from the top. There are no fasteners holding it in; molded-in snaps 43 trap everything in place by engaging in a boss 45 molded into the chassis.

Turning now to FIGS. 3*a*–*c*, as the printhead 18 moves toward the capped position (illustrated in FIG. 3*c*), a pen support 46 on the carriage 22 strikes an arm 48 on the sled 14 and aligns the cap 50 on the cap chamber 38 so that it caps around the pen's orifices in the orifice plate. The orifice plate is part of the printhead 18 and, due to its small dimensions, is not easily visible in the scale of the drawing depicted herein.

As illustrated in FIG. 3*a*, the cap 50 is made of dielectric material such as rubber, which is water repellent, such as rubber. The cap 50 is designed to surround the printhead nozzles rather than to contact them. In this manner, the cap 50 does not absorb the surplus ink nor does it wick the ink along its length, to be later removed by the pump 12.

As it will explained later, the printhead 18 is fired at least once into the cap chamber 38. The cap 50 being water repellent, preserves the moisture of the ink droplets inside the cap chamber 38, for substantially preventing the printhead 18 from completely drying out during capping.

As the pen support 46 strikes the arm 48, the sled 14 simultaneously rises up on ramps 52 and presses the cap 50 up against the perimeter of the orifice plate of the printhead 18, sealing the orifices from the atmosphere. Advantageously, the ramps 52 may be molded into a wall of the printer chassis. Bosses 53 support the sled 14 on the ramps 52.

As the sled 14 rises on its ramps 52, a pen catcher 54 engages a slot 56 in the printhead. When the printhead subsequently leaves the service station 10, the pen catcher 54 ensures that the sled 14 is returned to its inactive position, depicted in FIG. 3*b*.

The purpose of the ramped sled motion is to prevent wear on the cap 50 so that it will not need to be replaced during the life of the printer. The motion also allows movement of the cartridge 18 into position to activate the pump 12 through a multiplexer means (not shown) and then move back out of the multiplexer while being capped the entire time. Thus, the sled configuration of the invention impacts product reliability (through reduced cap wearout) and multiplexer design (through allowing motion while capped).

Once engaged by the multiplexer, motion of the paper motor 22 is coupled by suitable gearing (not shown) to the pump body 34 via bevel gear 42 and bevel gear 44.

Prior to capping, the printhead 18 moves across a wiper 58 secured in the wiper bracket 16. The wiper 58 comprises a blade, the edge of which scrapes paper dust and other contaminants off the orifice plate of the printhead 18. The wiper 58, which advantageously comprises a resilient material such as nitrile rubber, is cleaned by pocket edges (not shown) in the bottom of the printhead 18. These pocket edges are formed on either side of the printhead 18, by a plastic recesses in the pen cartridge 20.

Figure 4A:
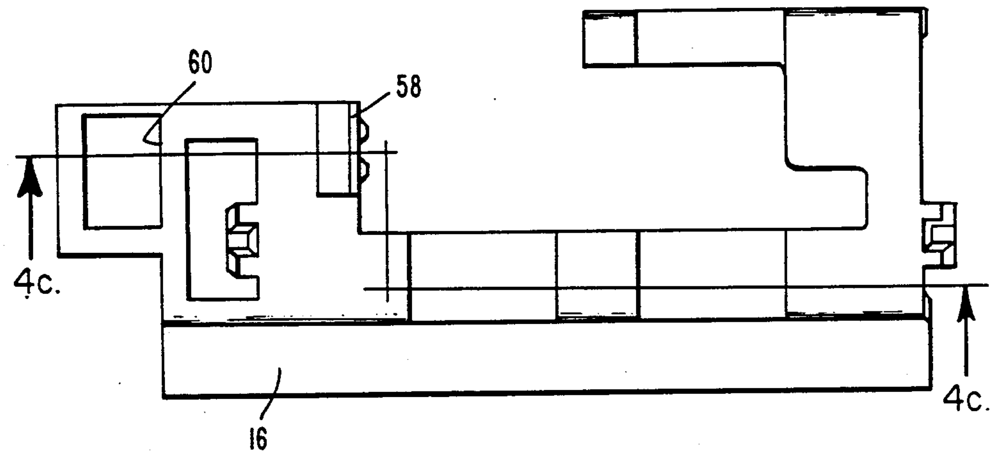
Figure 4B:
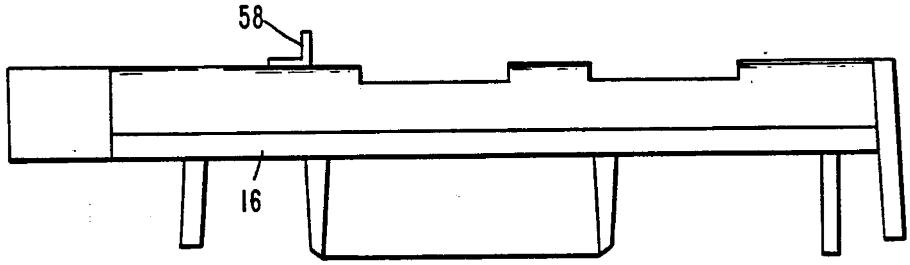

A control algorithm has been developed for the service station of the invention. On initial powerup, all nozzles are fired 32 times into the cap assembly 38. All nozzles are also fired four times into a spittoon 60, shown in FIG. 4*a*, which is part of the wiper bracket 16, each time the cartridge 20 leaves the service station 10 and four times into the cap chamber 38 each time the cap 50 is engaged.

Figure 4C:
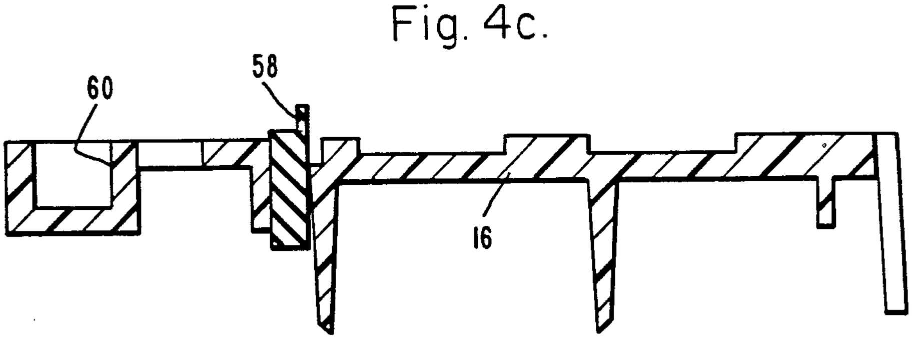

As further illustrated in FIG. 4*c*, the spittoon 60 includes a reservoir-like cavity or recess in the wiper bracket 16, for collecting the ink ejected from the printhead 18. When the collected ink evaporates, it leaves a very thin layer of deposit, and therefore the spittoon 60 does not fill up readily. All nozzles in the printhead 18 are also fired four times into the spittoon 60 every 60 seconds during printing.

These firings have two purposes. First, they are intended to clear any nozzle clogs which might develop before printing begins. This function is common to all ink-jet printers. Second, the droplets fired into the cap chamber 38 provide moisture to keep the printhead from drying up during capping. This function is not believed to be used on other ink-jet printers, and clearly provides an advantage, in that the printhead 18 provides its own moisture for humidification of inactive, capped nozzles.

The flow rate of ink through the nozzles for clearing printhead problems, such as viscous ink plugs and bubbles, is optimally about 1 to 5 $cm^3$/min. A displacement of about 0.06 to 0.15 $cm^3$ of ink is optimal for clearing such problems in the printhead.

INDUSTRIAL APPLICABILITY

The service station of the invention is useful in ink-jet printers, particularly in ink-jet printers employing thermal printheads.

Thus, there has been provided a service station for an ink-jet printer. It will be appreciated that various modifications and changes of an obvious nature may be made without departing from the spirit and scope of the invention, and all such modifications and changes are considered to fall within the scope of the invention, as defined by the appended claims.

What is claimed is:

1. A service station (10) for use in an ink-jet printer, the printer including a bidirectionally movable carriage (22) supporting in secured alignment a print cartridge (20) having a printhead (18) for printing onto a print medium, the carriage being driven by a controlled motor, the service station being fixed at one end of travel of the print carriage and comprising:

(a) pump means (12) for priming the printhead;
(b) a sled (14) to actuate the service station and having means (50) to seal the printhead;
(c) wiping means (58) for cleaning the printhead;
(d) said sled including cap means (50) for sealing the printhead nozzles;
(e) said cap means being maintained on a cap chamber (38) supported on said sled to which said pump means is operatively connected;
(f) said sled being movably supported on a ramp (52) and being provided with engageable means (48) associated with the carriage such that upon engagement by motion of the carriage; and
(g) said sled moving toward along said ramp to seal the printhead nozzles with said cap means.

2. The service station of claim 1 wherein said cartridge is provided with a slot (56) and said sled is provided with means (54) for engaging said slot during said sealing such that movement of said carriage out of said service station returns said sled to its lower, unramped position.

3. A service station (10) for use in an ink-jet printer, the printer including a bi-directionally movable carriage (22) supporting in secured alignment a print cartridge (20) having a printhead (18) for printing onto a print medium, the carriage being driven by a controlled motor, the service station being fixed at one end of travel of the print carriage and comprising:

(a) pump means (12) for priming the printhead;
(b) a sled (14) to actuate the service station and having means (50) to seal the printhead;
(c) wiping means (58) for clearing the printhead;
(d) said sled including cap means (50) for sealing the printhead nozzles;
(e) said cap means being maintained on a cap chamber (38) supported on said sled to which said pump means is operatively connected; and
(f) said wiping means being mounted on a wiper bracket (16) and being adapted to wipe debris from said printhead during movement of the carraige into the service station.

4. The service station of claim 3 wherein said wiper bracket further includes a spitton (60) for receiving ink jetted from said cartridge during warm-up thereof.

5. A service station for use in a printer having a carriage to support a cartridge, the cartridge including a printhead having nozzles for diffusing ink, the service station comprising:

(a) means for wiping residues off of the printhead;
(b) said wiping means being fixed at one end of travel of the carriage;
(c) sled means connected to said wiping means for capping the printhead by surrounding the printhead nozzles;
(d) said sled means being actuated by the carriage when the carraige moves to its end of travel position; and
(e) pump means connected to said sled means for priming the printhead.

6. The service station as defined in claim 5, wherein said wiping means includes:

(a) a wiper bracket affixed to the printer; and
(b) a blade affixed to said wiper bracket for engaging the printhead to scrape and remove contaminant particles off of the printhead.

7. The service station as defined in claim 6, wherein said blade has a resilient composition.

8. The service station as defined in claim 7, wherein said blade is cleaned by at least one pocket edge on the printhead.

9. The service station as defined in claim 6, wherein said wiper bracket includes recess means for receiving droplets of ink fired by the printhead, prior to actual printing to further clear the nozzles from any clog therein.

10. The service station as defined in claim 5, wherein said sled means includes:

(a) cap means which mates with the printhead when the carriage moves to its end of travel position; and
(b) arm means disposed adjacent to said cap means for engaging the carriage when the carriage moves to its end of travel position, in order to align said cap means with the printhead, and to cause said cap means to surround the printhead nozzles so as to form an air tight seal therearound, in order to protect the printhead from dust and other contaminants.

11. The service station as defined in claim 10, wherein said cap means further includes a chamber for receiving droplets of ink fired by the printhead when said cap means engages the carriage, in order to preserve the moisture of the ink droplets inside said chamber, for substantially preventing the printhead from completely drying out during capping.

12. The service station as defined in claim 11, wherein said cap means includes a cap substantially made of water repellent material, wherein said cap surrounds the printhead nozzles so as not to absorb surplus ink on the printhead.

13. The service station as defined in claim 10, wherein said sled means further includes means for catching the cartridge when the carriage is disengaged from cap means.

14. The service station as defined in claim 10, wherein said sled means is generally slidably moveable within said wiping means, between a rest position when the printhead is uncapped, and a ramped position when the printhead engages said sled means.

15. The service station as defined in claim 5, wherein printer includes a chassis, and wherein said pump means includes:

(a) a pump body connected rotatably to the chassis;
(b) a tube connected at one end to said sled means, and having a free open opposite end;

(c) a single, generally circular roller connected rotatably to said pump body; and (d) said pump body having a generally arcuate wall disposed adjacent to, and in alignment with said roller, such that a portion of said tube is fitted and squeezed between said pump body and said wall.

16. The service station as defined in claim 15, wherein said roller has a an axial hub; and wherein said pump body has a recess for receiving said axial hub to allow said pump body to rotate freely with respect to the printer chassis.

17. The service station as defined in claim 16, wherein said roller has two opposite circumferential ridges to center the squeezed portion of said tube in the area of highest pitching force.

18. The service station as defined in claim 15, wherein said pump body has snap means for engaging the printer chassis.

19. A method for using a service station in a printer having a carriage supporting a cartridge, the cartridge including a printhead having nozzles for diffusing ink, the method comprising the steps of:

(a) wiping residues off of the printhead;

(b) fixing said wiping means at one end of travel of the carriage;

(c) connecting sled means to wiping means for capping the printhead by surrounding the printhead nozzles;

(d) actuating said sled means by the carriage when the carriage moves to its end of travel position; and (e) connecting pump means to said sled means for priming the printhead.

* * * * *